(No Model.)
W. A. KONEMAN.
PROCESS OF REDUCING METAL.
No. 414,713. Patented Nov. 12, 1889.
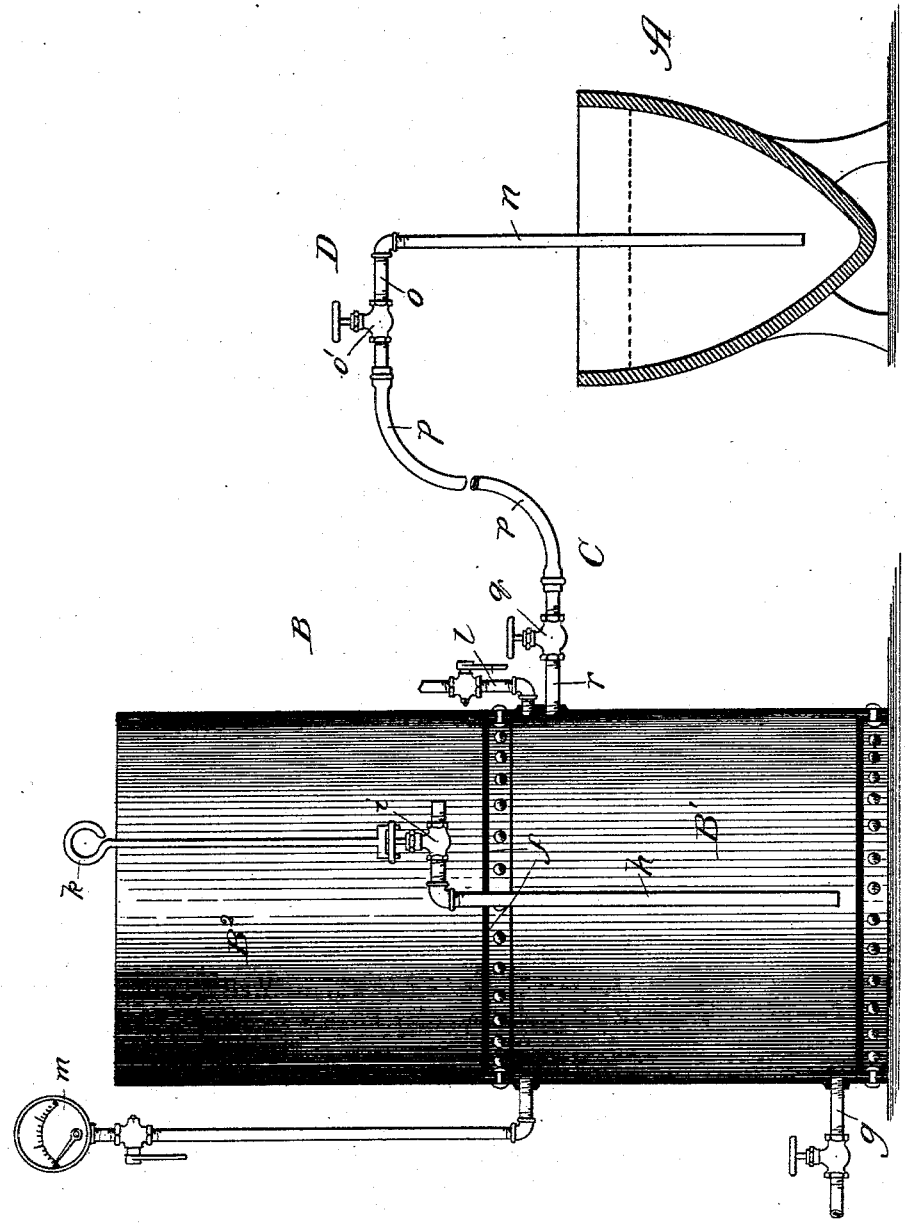
Witnesses:
Inventor:
William A. Koneman,
By Dyrenforth & Dyrenforth,
Att'ys

UNITED STATES PATENT OFFICE.

WILLIAM A. KONEMAN, OF CHICAGO, ILLINOIS, ASSIGNOR TO AZEL F. HATCH, OF SAME PLACE.

PROCESS OF REDUCING METALS.

SPECIFICATION forming part of Letters Patent No. 414,713, dated November 12, 1889.

Application filed November 27, 1888. Serial No. 291,967. (No specimens.)

*To all whom it may concern:*

Be it known that I, WILLIAM A. KONEMAN, a citizen of the United States, residing at Chicago, in the county of Cook and State of Illinois, have invented a new and useful Process of Reducing Metals, of which the following is a specification.

My invention relates to an improved process for reducing to a metallic state two or more metals and for freeing them from such compounds as they may have severally or unitedly formed in a molten mass with arsenic or antimony or with one or more of the non-metallic elements.

By my improvement any molten compound containing two or more metals may be acted upon by a treatment simple, practical, and inexpensive to reduce to a metallic state and set free such metals as the compound may contain.

I do not wish to be understood as including in my invention the making of steel or wrought or malleable iron from cast-iron or from iron ore; nor do I claim the deoxidizing of a metallic oxide when taken alone and not associated with other non-metallic elements; nor do I claim the refining of a single metal.

Broadly considered, my invention consists in treating any compound containing two or more metals jointly or severally combined with arsenic, antimony, or with one or more of the non-metallic elements by injecting or otherwise introducing into a molten mass thereof a suitable reducing-gas. By the term "non-metallic elements" is meant hydrogen, chlorine, bromine, iodine, fluorine, oxygen, sulphur, selenium, tellurium, nitrogen, boron, carbon, silicon, and phosphorus, and by the term "metals" is meant all other elements except arsenic and antimony. Hydrogen is known to form binary compounds with arsenic and antimony and with all the non-metallic elements, with the possible exception of boron, and to have a powerful affinity for them all, while it has little or no affinity for the remaining elements. Carbon also is known to combine with several of the non-metallic elements, while no well-characterized compounds of carbon with the metals have been obtained.

By the term "reducing-gas" herein employed is meant only such gas as will, when brought into contact with a molten-metal-bearing compound, form a new chemical compound with the element or elements in chemical combination with the metals, thus setting the latter free. I expressly disclaim as being included in the term "reducing-gas" atmospheric air, carbonic-acid gas, ($CO_2$,) oxygen, nitrogen, chlorine, fluorine, sulphur gases, and the gases or vapors of acid compounds. I include, however, within the term "reducing-gas" and expressly limit the term to include hydrogen, hydrocarbons, and the protoxide of carbon separately or jointly, but not intermixed with any other elements or compounds of elements as diluents or impurities, and a gas or vapor or compound of gases or vapors intermixed with any other elements or compounds of elements (including those disclaimed) as diluents or impurities, but wherein hydrogen, hydrocarbons, or protoxide of carbon are severally or jointly present in such excess that any chemical action which the intermixed diluents or impurities may tend to produce in the molten mass will be neutralized or only secondary.

I have discovered that by forcibly injecting or introducing a reducing-gas (such as hydrogen or hydrocarbon gas) into a molten mass containing metals which are chemically or mechanically combined with arsenic or antimony or with one or more non-metallic elements such metals in the compound are set free from the arsenic, antimony, and non-metallic elements and may be collected and saved. For example, I may thus set free lead or zinc from their compounds of sulphate or sulphide of lead or zinc, or of oxide or silicate of lead or zinc; or I may set free a number of metals contained in a molten mass—as, for instance, in the slags from lead-silver-smelting furnaces, which usually contain lead, zinc, silver, and iron, and frequently other metals which it is desirable to save.

While my improved process may be applied with equally good results to the liberation of metals in whatever chemical condition in a molten mass they may exist, the details of my invention may conveniently be explained in its application to the separation from the slags of smelting-furnaces of the metals contained therein.

Generally speaking, by the various methods of smelting hitherto discovered and practiced a considerable portion of the metals which it is desired to save from the ore is not saved, but remains in the waste and by-products of the treatment, thereby entailing in the aggregate the loss of a vast quantity of the metals, representing an enormous value, to save which no sufficiently cheap and practicable method has hitherto been discovered. By my improved process I am enabled to save these metals in valuable quantities, and have employed for the purpose the apparatus illustrated in broken sectional elevation in the accompanying drawings, in which—

A denotes a slag pot or receptacle of any desired size or form; B, a gas-receiver, which may be open at its upper end and may be divided by a diaphragm F into two compartments B' and B², into which first-named compartment a reducing-gas (preferably pure hydrogen or hydrocarbon gas) is forced under pressure sufficient to overcome the static pressure of the molten contents in the receptacle A, and C is a conduit communicating controllably with the receiver, and which may comprise as a simple and convenient construction a spout $r$, having a valve $q$, rubber hose $p$, connected with the spout, and a tube D, formed in two parts $o$ and $n$ at right angles to each other, the part $o$ being connected with the hose $p$ and containing a valve $o'$. The receiver B should be provided with a pressure-gage $m$.

To charge the receiver, I first fill it with water up to the level of a pipe $l$, and then open, through the medium of a suitable rod $k$, a valve $i$ in a pipe $h$, which reaches nearly to the bottom of the receiver. The gas is then forced through a pipe $g$ into the compartment B' and forces the water through the pipe $h$ into the upper compartment. When the water has been all replaced in the lower compartment by gas, the valve $i$ is closed. By these means air (which would tend to render the gas when used explosive) is not permitted to enter the receiver. Molten slag is run from a smelting-furnace into the receptacle A, and the tube D, with the hydrogen or hydrocarbon gas flowing through it, is inserted into the molten mass, the gas being thereby injected into the latter, and the action of the reducing-gas is to render metallic and set free the metals contained in the mass by attacking and uniting with the non-metallic elements present and with arsenic and antimony if present, thus forming gases or vapors, which escape. If the molten slag or compound is sufficiently fluid, the reduced metals will tend to settle to the bottom of the receptacle in the order of their respective gravities, or, in the case of the alloying metals, will form alloys during the progress of reduction or of precipitation, and even after precipitation. If the molten compound treated be not sufficiently fluid to allow of precipitation of the metals when reduced to a metallic state, they will remain suspended in the compound, and may be removed therefrom when cold by any suitable mechanical means. If the temperature of the compound treated be above the vaporizing-point of any of the metals reduced, as will often be the case with compounds containing zinc, those metals the vaporization of which is below the temperature of the molten mass containing them will, upon being set free, at once be vaporized and will escape as vapor and may be saved by any suitable mechanical means. The hydrogen forms chemical compounds with the arsenic, antimony, and all the non-metallic elements with which the metals contained in the slag can possibly be united—such as oxygen, chlorine, sulphur, phosphorus, carbon, silicon, &c.—either by direct reaction with such as oxygen or chlorine or by both direct and indirect reaction with such as sulphur, arsenic, and phosphorus through the aid of previously-formed hydrides with oxygen, chlorine, &c., thereby producing, for instance, sulphureted-hydrogen gas by direct reaction or sulphurous acid by indirect reaction through the aid of oxygen hydride first formed, so that the hydrogen may first set free metallic iron by combining with the oxygen in the oxide of iron contained in the molten mass, and the oxygen hydride thus formed may combine with sulphur or with sulphureted hydrogen obtained from, say, iron sulphide or matte contained in the same molten mass.

I wish to be clearly understood as not including as within my invention the use of any oxidizing agents or gas—such as oxygen or atmospheric air—because the reactions which my process produces are directly the opposite of those produced in the refining of metals or mattes by the injection of oxidizing agents or gas into the latter when melted. Thus the Bessemer process purifies to a great extent by the aid of oxide of iron formed by oxidizing the melted iron undergoing treatment.

The main difference between the use of oxidizing agents or gas as the injected medium of treatment and my process, wherein a reducing-gas is injected, lies, therefore, in the fact that the former acts upon and combines with the metal itself, converting a large portion thereof into an oxide of the metal, and, besides, producing only an oxidizing action on the non-metallic elements which are mixed or combined with the metal or metals under treatment, while by my invention the gas employed, being a reducing agent, does not attack or destroy the metal or metals undergoing treatment, but sets them free and saves them by attacking and combining with arsenic and antimony, if present, or with such non-metallic elements as form either chemical or mechanical compounds with the metal or metals undergoing treatment.

To distinguish my invention still further may be mentioned a known refining process of removing from copper matte the iron, sulphur, and other substances deleterious to copper. Herein the matte is melted and air injected until the iron and sulphur are oxidized by the oxygen of the injected air, and practically only the copper and the precious non-oxidizable metals are left. As the amount of iron in matte is usually nearly equal to the copper in the mass, it is readily apparent that the treatment depends for its success on the lesser liability of copper to become oxidized than of the iron; but it is a fact that not only is the iron all sacrificed, but the loss of copper under the treatment is found to be very great.

By my process merely arsenic, antimony, and the non-metallic elements mixed or combined with the iron and copper are removed, while the copper and iron together are saved, the latter thus becoming a valuable product. This illustrates wherein my invention differs from refining methods and processes, the object therein being to obtain a particular metal in its greatest possible purity, even if this be done at the expense and loss of other valuable metals. My object is to recover the greatest amount and number of metals from their various chemical combinations in a molten condition, the reduced metals being obtained either separated one from the other or others in the resulting products or alloyed one with another or others, leaving the matter of refining and separating them to subsequent treatment.

What I therefore accomplish by my invention is: first, the simultaneous reduction to a metallic state of and making available for use or the market (without reference to absolute isolation of each metal) two or more of the metals contained in a molten compound in other than a metallic state; second, the simultaneous removal of arsenic and antimony and the non-metallic elements which may be combined with two or more of the metals contained in a molten compound; third, the liberation of two or more of the metals from their union with non-metallic elements when contained in and disseminated through a molten compound of earthy minerals—such as silica and lime—which earthy minerals form a residual slag with such of the metals as have not undergone reduction or were only partially reduced by treatment, owing to insufficient time being given or owing to insufficient heat or other causes.

If means be provided to prevent too ready loss of heat from the receptacle A, and thus maintain the molten condition of its contents during the period of operation, heat generated by the chemical reaction produced by the injected reducing-gas will be sufficient to retain the required temperature of the molten mass to permit thorough action of the reducing agent. When, however, the conditions are not favorable for retaining sufficient heat in the receptacle, heat may be applied thereto externally, and this must necessarily be done where the substance containing the metals to be reduced or where the metals to be treated are not introduced into the receptacle in a molten condition, but are required to be melted therein.

What I claim as new, and desire to secure by Letters Patent, is—

1. The process of treating, substantially as and for the purpose set forth, any compound containing a multiple number of metals jointly or severally combined with arsenic or antimony or with one or more non-metallic elements, which consists in setting free two or more of such metals by introducing into a molten mass of the compound a reducing-gas, substantially as described.

2. The process of recovering from a molten furnace-slag and other molten compounds containing non-metallic elements combined with one or more volatilizable metals and one or more non-volatilizable metals one or more metals in a metallic state and one or more metals in a vaporized state, which consists in setting free such metals by introducing a reducing-gas into the molten mass and saving the escaping vapors of metal, substantially as described.

3. The process of producing alloys of two or more alloying metals from molten compounds of such alloying metals jointly or severally combined with non-metallic elements, which consists in reducing such alloying metals to a metallic state in the presence of each other in the molten compound by introducing a reducing-gas into the molten mass, substantially as described.

4. The process of producing alloys of two or more alloying metals from molten compounds of such alloying metals jointly or severally combined with non-metallic elements, which consists in setting free the alloying metals and precipitating them one upon another in the molten state by introducing a reducing-gas into the molten compound, substantially as described.

WILLIAM A. KONEMAN.

In presence of—
J. W. DYRENFORTH,
M. J. BOWERS.